(12) United States Patent
Bechtel et al.

(10) Patent No.: US 6,222,177 B1
(45) Date of Patent: Apr. 24, 2001

(54) ELECTROCHROMIC ELEMENT DRIVER WITH NEGATIVE OUTPUT RESISTANCE

(75) Inventors: Jon H. Bechtel; Robert R. Turnbull; William L. Tonar; John S. Anderson, all of Holland; G. Bruce Poe, Hamilton, all of MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 09/233,270

(22) Filed: Jan. 19, 1999

(51) Int. Cl.[7] ..................................... H01J 40/14
(52) U.S. Cl. ............... 250/214 B; 359/265; 359/603; 359/604
(58) Field of Search .............. 250/214 AL, 214 B; 359/603, 604, 265

(56) References Cited

U.S. PATENT DOCUMENTS

| | | |
|---|---|---|
| 4,443,057 | 4/1984 | Bauer et al. . |
| 4,580,875 | 4/1986 | Bechtel et al. . |
| 4,917,477 | 4/1990 | Bechtel et al. . |
| 5,231,531 | 7/1993 | Defendini et al. . |
| 5,451,822 | 9/1995 | Bechtel et al. . |
| 5,675,438 | 10/1997 | Nagao et al. . |
| 5,694,144 | 12/1997 | Lefrou et al. . |

FOREIGN PATENT DOCUMENTS

| | | |
|---|---|---|
| WO 98/37453 | 8/1998 | (DE) . |
| 0 285 724 A2 | 10/1988 | (EP) . |
| 0 869 032 A2 | 10/1998 | (EP) . |

*Primary Examiner*—F. L. Evans
(74) *Attorney, Agent, or Firm*—Price, Heneveld, Cooper, DeWitt & Litton; Brian J. Rees

(57) ABSTRACT

An electrochromic element driver has a feedback loop that imparts a negative output resistance wherein the drive voltage across the electrochromic element varies in response to changes in current draw by the electrochromic element. The amount of current drawn by the electrochromic element varies as a function of temperature. At high temperatures, the drive voltage increases, enabling the electrochromic element to darken uniformly at high temperatures. At lower temperatures, the drive voltage decreases, improving the useful life of the electrochromic element. Transitions between the opaque and non-opaque states are achieved quickly, and steady state currents are lower than in many conventional implementations, decreasing power consumption.

9 Claims, 5 Drawing Sheets

ELECTROCHROMIC ELEMENT DRIVER WITH NEGATIVE OUTPUT RESISTANCE

FIELD OF THE INVENTION

The present invention relates to electrochromic elements used for example, in automobile rear view mirrors. More particularly, the present invention relates to control circuitry used in conjunction with such electrochromic elements.

BACKGROUND

Various electrochromic mirror and electrochromic window systems, collectively known as electrochromic elements, are generally known in the art. Such electrochromic elements typically change their light reflectance or transmittance properties in response to variations in environmental light conditions. For instance, a typical electrochromic rear view mirror normally operates in a full reflectance mode during the day, but reduces its reflectance at nighttime to protect the driver from glare effects from light emanating from the headlights of vehicles approaching from behind. Such automatic rear view mirrors have become increasingly sophisticated over the years, and the automatic rear view mirror for automotive vehicles disclosed in U.S. Pat. No. 4,443,057, issued Apr. 17, 1984, for Automatic Rearview Mirror for Automotive Vehicles, and assigned to the assignee of the present invention, is typical of such sophisticated automatic rear view mirrors. An improved electronic control system for automatic rear view mirrors is disclosed in U.S. Pat. No. 4,580,875, issued Apr. 8, 1986, for Electronic Control System for Automatic Rearview Mirrors for Automotive Vehicles, also assigned to the assignee of the present invention. The disclosures of U.S. Pat. Nos. 4,443,057 and 4,580,875 are specifically incorporated herein by reference.

Typically, these automatic rear view mirrors use an electrochromic chemical whose opacity changes in response to a voltage applied across it. One or more light sensors determine the amount of light in front of and/or behind the vehicle. Based on this information, a voltage is applied across the electrochromic chemical to cause it to become either more or less opaque. Thus, the automatic rear view mirror responds to glare from behind the vehicle by automatically shifting to a partial or low reflectance mode. After the source of the glare is removed, the automatic rear view mirror returns to the full or high reflectance mode without any driver intervention.

Electrochromic elements are also used, for example, in light-sensitive windows. In this application, an electrochromic chemical responds to an applied voltage by changing its opacity. As in the automatic rear view mirror, one or more light sensors detect the amount of light present. Based on the ambient light level, a voltage is applied across the electrochromic chemical, causing it to change its opacity. For example, during the day, the relatively high ambient light level causes one voltage level to be generated that causes the electrochromic chemical to become more opaque, making the window appear darker, thereby blocking potentially harmful sunlight, for example. By contrast, at night, the low ambient light level causes another voltage level to be generated that causes the electrochromic chemical to become less opaque. As a result, the window becomes more transparent. Of course the converse can be facilitated if more transparency is desired during daylight and more opacity is desired at nighttime.

In both of these types of electrochromic elements, the applied voltage level, or drive voltage, affects the operational characteristics of the electrochromic element. A high drive voltage, for example, optimizes the transition time for changes in opacity. The drive voltage involved in achieving acceptably fast transition times is somewhat higher than the voltage involved in minimizing reflectance in the steady state condition. High temperatures further increase the drive voltage required to cause the electrochromic element to darken fully to the center. The extra drive voltage overcomes losses attributable to series resistance in the transparent conductive coatings. As the drive voltage increases, however, the electrochromic chemical becomes more susceptible to degradation. Consequently, the color and functional characteristics of the chemical are adversely affected, and its life span is shortened. These effects are particularly pronounced at low temperatures, e.g., during the winter.

Accordingly, a relatively high drive voltage is desirable in high temperature environments, while a relatively low drive voltage is better suited for cold weather. Many conventional electrochromic elements employ a compromise drive voltage, trading off between full darkening in hot weather and element life at low temperatures. As a result, such electrochromic elements suffer from incomplete darkening and/or shortened element life to some degree.

SUMMARY OF THE INVENTION

One aspect of the present invention is directed to an electrochromic element driver having a negative output resistance, such that the voltage applied to the electrochromic element varies as a function of element current, which is a function of temperature. As a result, the drive voltage increases at high temperatures and decreases with low temperatures. The use of a negative output resistance leads to faster transition times between the opaque and non-opaque states and lower steady state currents. Further, at high temperatures, the electrochromic element darkens more uniformly across its entire surface than many conventionally-controlled electrochromic elements. In the steady state, the drive voltage is lower than in many conventional drivers, slowing degradation of the electrochromic chemical and thus improving the life of the electrochromic element.

According to one embodiment, the present invention is directed to a control arrangement for controlling an electrochromic element. The control arrangement includes a drive circuit that selectively applies a drive voltage across the electrochromic element in response to at least one of a glare signal and an ambient light level. The drive circuit is characterized by a negative output resistance. A feedback arrangement, integral with the drive circuit, varies drive voltage as a function of current drawn by the electrochromic element. At least one light sensor arrangement detects the ambient light level and provides an indication thereof to the drive circuit.

Other particular embodiments of the present invention are directed, for example, to such control arrangements in which the feedback arrangement increases the drive voltage in response to an increase in an amount of current drawn by the electrochromic element. According to still another particular embodiment, the feedback arrangement includes a microcontroller having at least first and second outputs. One transistor arrangement is coupled to the first output of the microcontroller and enters a conducting mode when the first output is asserted. Another transistor arrangement is coupled to the first transistor arrangement and reduces the base voltage of the first transistor arrangement when an output voltage at the electrochromic element exceeds the sum of an emitter voltage of the second transistor arrangement and the base voltage. Still another transistor arrangement is responsive to the other two transistor arrangements and controls the output voltage at the electrochromic element.

The above summary of the present invention is not intended to describe each illustrated embodiment or every implementation of the present invention. The figures and the detailed description that follow more particularly exemplify these embodiments.

BRIEF DESCRIPTION OF THE DRAWINGS

These and other aspects and advantages of the present invention will become apparent upon reading the following detailed description and upon reference to the drawings, in which.

Figure 1:
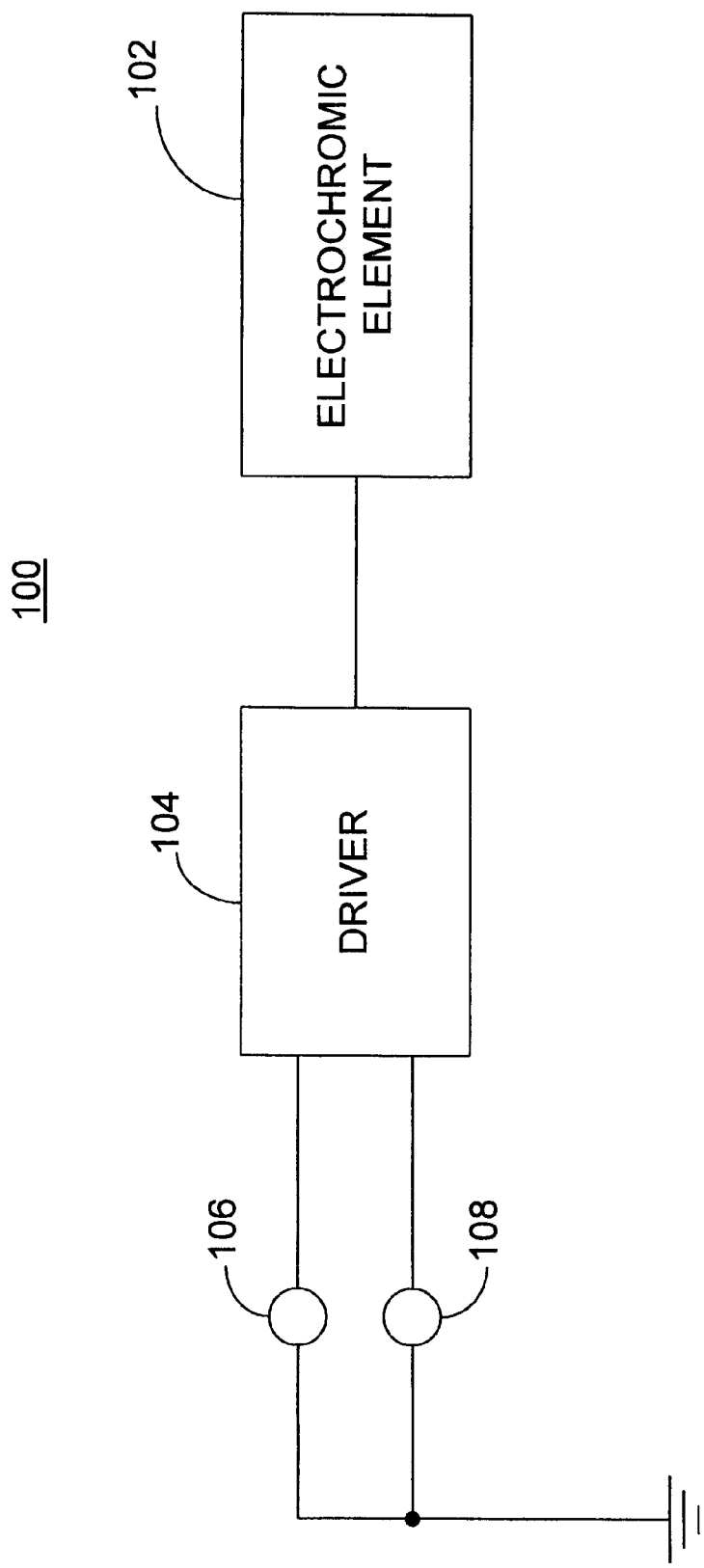
FIG. 1 is a block diagram illustrating an electrochromic element control arrangement, according to a particular embodiment of the present invention.

The invention is amenable to various modifications and alternative forms. Specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to a variety of systems and arrangements for controlling electrochromic elements. The invention has been found to be particularly advantageous for use in connection with electrochromic mirrors or windows in automotive environments operating over a range of temperatures. An appreciation of various aspects of the invention can be gained through a discussion of various application examples operating in such environments.

According to one aspect of the present invention, an electrochromic element driver is characterized by a negative output resistance. Current draw of the electrochromic element varies as a function of temperature, generally increasing at a higher temperature. As a result of the negative resistance characteristic of the drive circuit and the increased current to the element at higher temperatures, the drive voltage increases at high temperatures and decreases with low temperatures. The drive voltage also increases during transitions when the current draw in the electrochromic element peaks. During these transitions, the IR drops in the system are at a maximum, and a higher drive voltage helps to compensate for these drops to maintain the desired voltage at the chemical layer of the element. Using an electrochromic element driver having a negative output resistance produces several benefits, including, for example, faster transition times between the opaque and non-opaque states and lower steady state currents. Further, at high temperatures, the electrochromic element exhibits improved uniformity of darkening across its entire surface. In the steady state, the drive voltage is lower than in many conventional drivers, slowing degradation of the electrochromic chemical and thus improving the life of the electrochromic element.

Referring now to the drawings, FIG. 1 illustrates an example electrochromic element control arrangement 100, according to one embodiment of the present invention. An electrochromic element 102, such as a mirror or window, contains an electrochromic chemical (not shown) whose opacity changes in response to a drive voltage applied across the electrochromic element 102. A driver 104 generates the drive voltage based on input received from, for example, light detectors 106 and 108. The driver 104 can be incorporated into the electrochromic element 102 itself to enable the electrochromic element 102 to be controlled by a glare signal, e.g., a pulse width modulated (PWM) signal or digital signal, from inside the vehicle. Assuming a PWM signal is used to control the electrochromic element 102, the reflectance level of the electrochromic element 102 is varied by varying the duty cycle of the PWM signal.

In the embodiment illustrated in FIG. 1, the ambient signal is developed by a forward-facing light detector 106, such a photocell, which receives light from in front of the vehicle, thus providing an indication of the ambient light level. A rear-facing light detector 108, which can also be implemented using a photocell, takes in light from behind the vehicle, which comes from both ambient light sources and vehicles approaching from behind. One or both of the light detectors 106 and 108 can be integrated in the electrochromic element 102.

The driver 104 uses the ratio in light levels sensed by the light detectors 106 and 108 as an indication of the amount of glare relative to the ambient light level. Based on this information, the driver 104 controls the reflectance of the electrochromic element 102 by applying an appropriate drive voltage across it. For example, if the driver 104 determines that the glare level is high, it applies a predetermined drive voltage to cause the electrochromic chemical to become more opaque. As a result, the electrochromic element 102 darkens and assumes a partial reflectance state. By contrast, if the glare level is low, the driver 104 applies a lower predetermined drive voltage that maintains the electrochromic chemical in a nonopaque state, such that the electrochromic element 102 assumes a full reflectance state.

Figure 2:
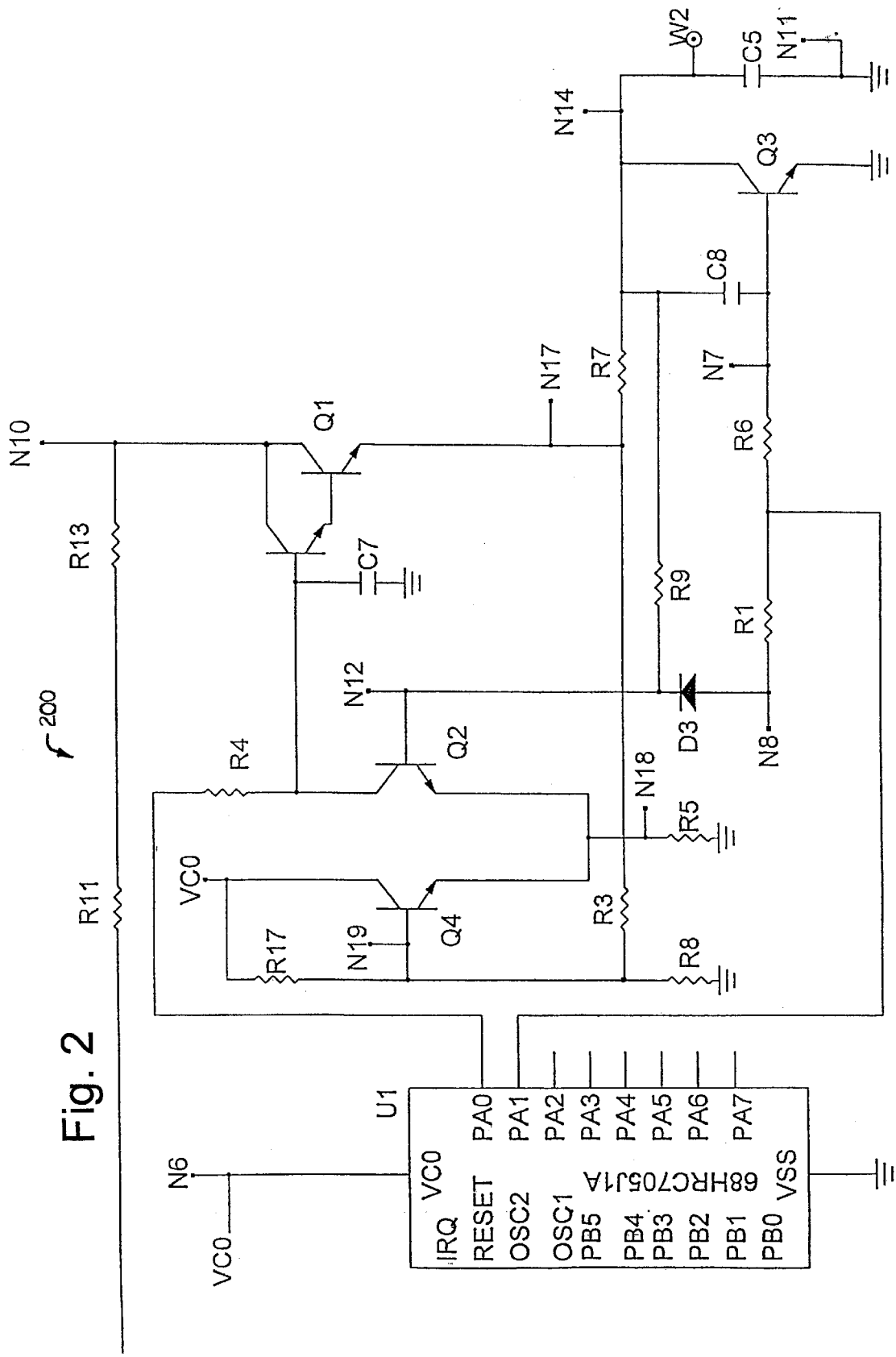
FIG. 2 is a schematic diagram illustrating an example electrochromic element control arrangement, according to another embodiment of the present invention.

Various electronic drive circuit arrangements are suitable for controlling the electrochromic element 102 of FIG. 1, according to the present invention. FIG. 2 is a schematic diagram of an example drive circuit 200 for use in driving an electrochromic element, according to a particular embodiment of the present invention. In this example circuit, transistors Q4 and Q2 form a differential pair. A common emitter resistor, designated as R5 on FIG. 2, provides the emitter current for both transistors Q4 and Q2. Resistors R17, R3, and R8 form a voltage divider, which provides a reference voltage for the base of the transistor Q4. The voltage at the emitters of the transistors Q4 and Q2 is stabilized at $V_{be}$ less the base voltage of the transistor Q4.

A microcontroller U1 controls the operation of the drive circuit 200. FIG. 2 depicts the microcontroller U1 as implemented using an accumulator-based Motorola MC68HRC705J1A-type one time programmable microcontroller unit (MCU). The microcontroller U1 has eight outputs designated as PAx, where x is an integer between 0 and 7, inclusive. When the output PA0 is brought high, a transistor Q1 is turned on. When the output voltage present at an output W2, at which the electrochromic element is connected, reaches the emitter voltage of the transistor Q2 plus $V_{be}$, the transistor Q2 begins to conduct. As a result, the base voltage of the transistor Q1 is reduced.

Due to this negative feedback, the voltage at the output W2 is forced to match the base voltage of the transistor Q4. Resistors R11 and R13 supply the collector current to the transistor Q1 while dropping the supply voltage from a nominal 14 V, thereby reducing the amount of power dissipated by the transistor Q1. A capacitor C7 reduces loop gain at high frequencies and stabilizes the feedback loop. All of the load current to the electrochromic element flows through a current sensing resistor R7, which senses the amount of current drawn by the electrochromic element so that the drive voltage can be adjusted accordingly.

As the load current increases, the emitter of the transistor Q1 becomes more positive due to the drop across the current sensing resistor R7. The emitter voltage of the transistor Q1 is fed back to the base of the transistor Q4 through a resistor R3. The positive current feedback provided by the resistor R3 raises the reference voltage at the base of the transistor Q4, raising the output voltage at the output W2. This gives the output the desired negative source resistance characteristic. In this manner, an increase in the amount of current drawn by the electrochromic element leads to increased output voltage at the output W2. A capacitor C5 is connected across the electrochromic element to provide electromagnetic interference (EMI) protection and reduce loop gain at high frequencies to stabilize the feedback loops.

A transistor Q3 is used to short the electrochromic element when it is desirable to clear the electrochromic element. To prevent radio frequency (RF) interference, a capacitor C8 slows the switching time of the transistor Q3. The base current to turn on the transistor Q3 is supplied from an output PA1 of the microcontroller U1 through a resistor R6.

A resistor R1 and a diode D3 provide a lockout function to prevent the transistors Q1 and Q3 from conducting simultaneously. When the output PA1 of the microcontroller U1 is high, current flows through the resistor R1 and the diode D3 to raise the base voltage of the transistor Q2 above the base voltage of the transistor Q4. Accordingly, the transistor Q2 is turned on, while the transistor Q1 is turned off. When the output PA1 is low, the diode D3 is reverse-biased and does not affect normal circuit operation.

An identification and/or typical values for the components of the system illustrated in FIG. 2, which are described hereinabove, are as follows:

| R1 | Resistor | 1.5k |
|---|---|---|
| R3 | Resistor | 2.16k |
| R4 | Resistor | 1.0k |
| R5 | Resistor | 100 |
| R6 | Resistor | 1.5k |
| R7 | Resistor | 10 |
| R8 | Resistor | 931 |
| R9 | Resistor | 100 |
| R11 | Resistor | 10 |
| R13 | Resistor | 10 |
| R17 | Resistor | 4.75k |
| C5 | Capacitor | 0.1 uF,50 V |
| C7 | Capacitor | 0.1 uF,50 V |
| C8 | Capacitor | 0.1 uF,50 V |
| D3 | Diode | BAS16LT1 |
| Q1 | Transistor | MJD112 |

-continued

| Q2 | Transistor | MMBR3904 |
|---|---|---|
| Q3 | Transistor | MMBR2222 |
| Q4 | Transistor | MMBR3904 |
| U1 | Microcontroller Unit | MC68HRC705J1A |

Figure 3A:
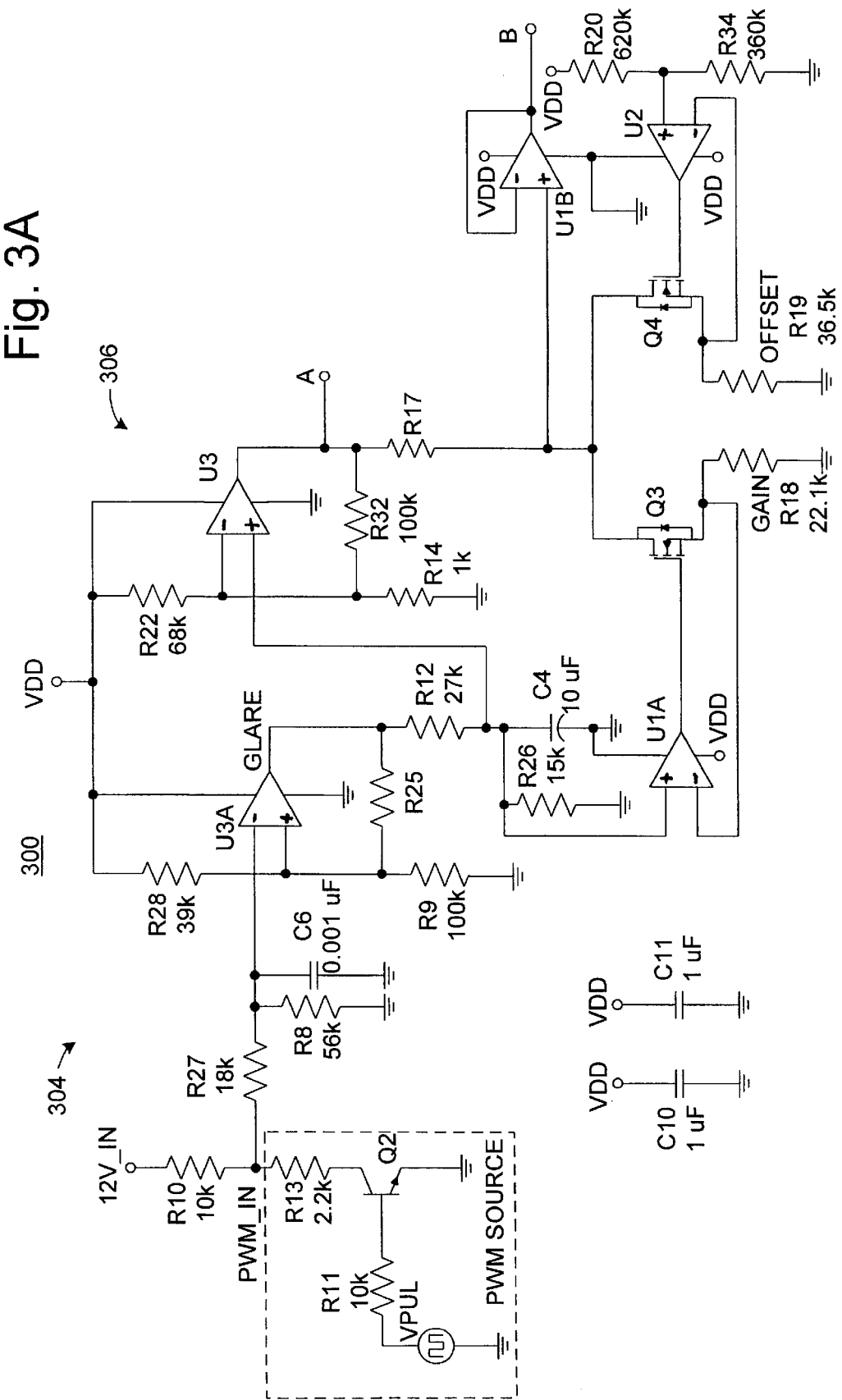
FIGS. 3A and 3B are diagrams depicting another example electrochromic element control arrangement, according to still another embodiment of the present invention.
Figure 3B:
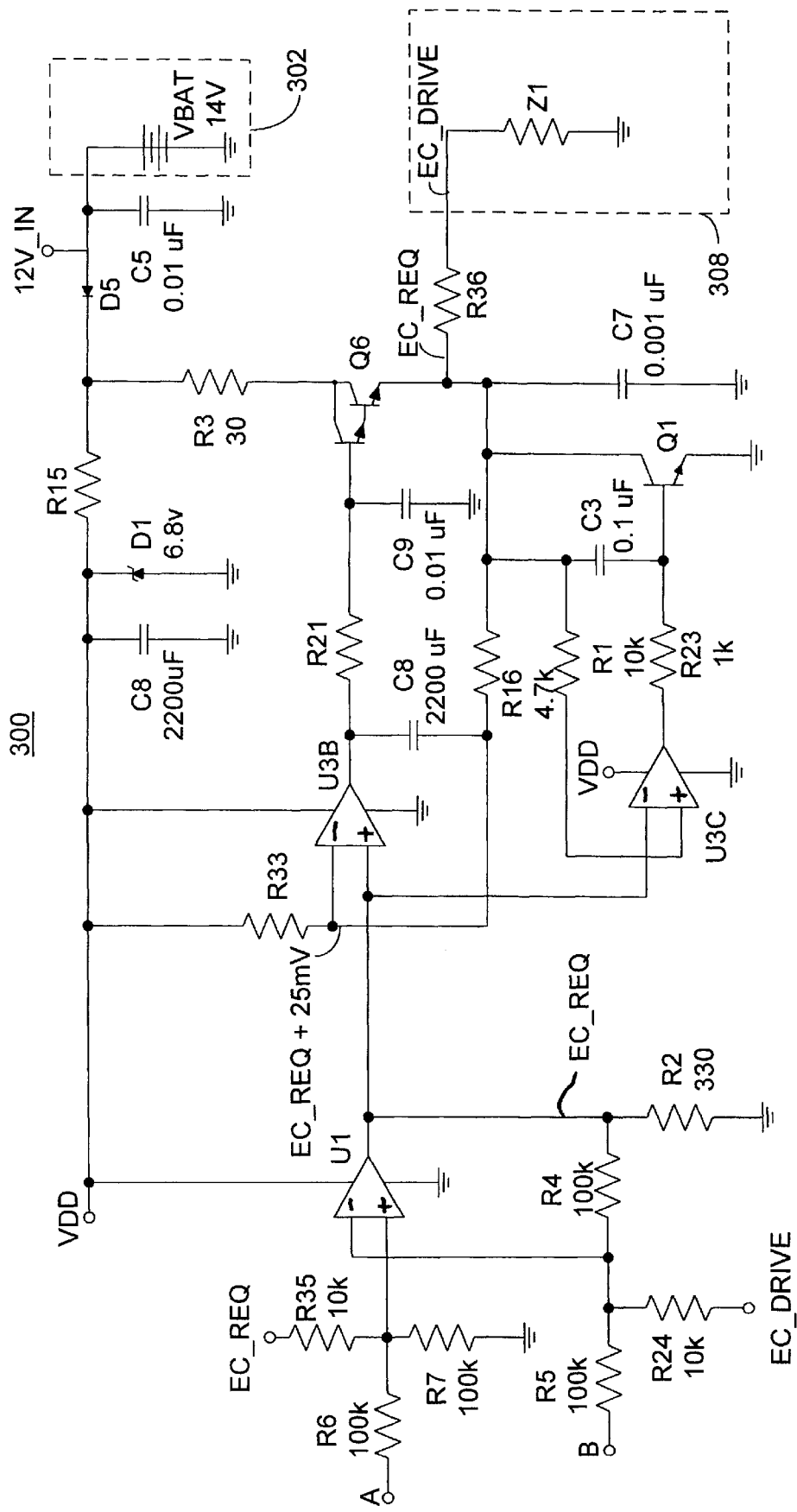

FIGS. 3A and 3B are schematic diagrams illustrating an example drive circuit 300 for use with an electrochromic element, according to another embodiment of the present invention. In FIG. 3A, resistors R11 and R13 and a transistor Q2 are used to simulate a pulse width modulated (PWM) signal PWM_IN, which represents the glare level control signal. It should be noted that the resistors R11 and R13 and the transistor Q2 are not actually present in the electronic drive circuit 300.

The electronic drive circuit 300 is powered by a nominal 12 volt vehicle battery 302 (FIG. 3B). A resistor R15 and a Zener diode D1 form a Zener regulated supply $V_{DD}$ and provide a reference voltage for differential amplifiers U1, U1A, U1B, U1C, U2, U3, U3A, U3B, and U3C. A capacitor C5, connected between the positive terminal of the battery 302 and ground, provides electromagnetic interference (EMI) bypassing. A diode D5 having its anode connected to the positive terminal of the battery and its cathode connected to the 12 volt supply 12V_IN, provides reverse polarity protection. Resistors R8, R9, R10, R25, R27, and R28, a capacitor C6, and a differential amplifier U3A form a comparator circuit 304 (FIG. 3A) to eliminate ground and amplitude errors in the PWM glare signal from the inside mirror assembly. In some implementations in which a bus receiver is located physically close to the electrochromic element, the comparator circuit 304 can be eliminated.

The PWM signal PWM_IN is applied to an inverting terminal of the differential amplifier U3A through the resistor R27. The resistor R27, along with the resistor R8, connected between the inverting terminal of the differential amplifier U3A and ground, form a voltage divider to prevent the PWM signal PWM_IN from exceeding the common mode range of the differential amplifier U3A. The resistor R10, which is coupled to the 12 volt supply 12 V_IN, is used to pull up the PWM signal PWM_IN. The capacitor C6 is connected between the inverting terminal of the differential amplifier U3A and ground to provide filtering and radio frequency (RF) immunity.

A reference voltage supply is applied to the non-inverting terminal of the differential amplifier U3A. In particular, a pair of resistors R9 and R28 form a voltage divider to create a reference voltage at the non-inverting input of the differential amplifier U3A. The resistor R25, connected between the output and the non-inverting input of the differential amplifier U3A, forms a feedback loop and provides hysteresis to improve the noise immunity of the differential amplifier U3A.

The output of the differential amplifier U3A is a glare control signal GLARE that has two states, nominally 0 V and 3.4 V, and is proportional to the level of glare sensed and transmitted by the mirror. A capacitor C4 is coupled between the non-inverting input of the differential amplifier U3C and ground to average the PWM signal PWM_IN to provide a DC glare signal EC_REQ, which is proportional to the duty cycle of the PWM signal PWM_IN.

The glare signal GLARE is applied to a slope and offset adjust circuit 306, which includes differential amplifiers U1A, U1B, U2, and U3; transistors Q3 and Q4; resistors R12, R14, R17, R18, R19, R20, R22, R26, R32, and R34;

and a filter circuit using the capacitor C4. The transistors Q3 and Q4, which are depicted as enhancement mode N-channel metal-oxide-semiconductor field-effect transistors (MOSFETS) in FIG. 3A, form a differential pair. A resistor R17 serves as a common drain resistor and provides the drain current for both of the transistors Q3 and Q4. The gate voltages of the transistors Q3 and Q4 are supplied by differential amplifiers U1A and U2, respectively.

The resistors R12 and R26 form a voltage divider that provides a reference voltage, which is proportional to the glare signal GLARE, at the non-inverting input of the differential amplifier U1A. The inverting input is connected to the source terminal of the transistor Q3, forming a feedback loop Differential amplifier U1A and transistor Q3 are configured to regulate the voltage at the source of Q3 to the voltage at the non-inverting input of U1A. A gain resistor R18 scales the source current to a voltage and sets the gain or slope of the reflectance curve of the electrochromic element.

The resistors R20 and R34 form a voltage divider that provides a reference voltage of, for example, 2.5 V at the non-inverting input of the differential amplifier U2. The inverting input is connected to the source terminal of the transistor Q4, forming a feedback loop. Differential amplifier U2 and transistor Q4 are configured to regulate the voltage at the source of Q4 to the voltage at the non-inverting input of U2. A resistor R19 scales the source current of the transistor Q4 to a voltage and adjusts the offset of the reflectance curve. The resistor R19 can optionally add a negative offset to hold the electrochromic element voltage EC_DRIVE at about 0 V until a minimum duty cycle is achieved.

Resistors R4, R5, R6 and R7, along with differential amplifier U1 (FIG. 3B) form a balanced amplifier that replicates the voltage developed across R17 by the sum of the currents flowing through R18 and R19, yielding EC_REQ. Given the limited current sinking capability of U1, resistor R2 is provided to sink current as needed. Optional temperature compensation can be provided for the glare signal EC_REQ using a thermistor in place of R12 to provide increased drive voltage at high temperatures to help the element darken fully.

A pair of differential amplifiers U3C and U3B drive transistors Q1 and Q6 to either drive or shunt an electrochromic element 308, depending on the difference between the DC glare signal voltage EC_REQ and the electrochromic element voltage EC_DRIVE, developed across R36. This difference provides positive current feedback via R24 and R35, which results in a negative output resistance. In FIG. 3, the electrochromic element 308 is simulated by impedance Z1. If the electrochromic element voltage EC_DRIVE exceeds the glare signal voltage EC_REQ, the differential amplifier U3C compensates by providing additional base current to transistor Q1, which shunts the electrochromic element 308, discharging it and causing its reflectance to increase as the opacity of the electrochromic chemical decreases. The voltage at the output of the differential amplifier U3C stabilizes at the point required causing the drive transistor Q1 to sink just enough current to match the EC_DRIVE and EC_REQ signals.

A resistor R23, connected to the output of the differential amplifier U3C, limits the base current to the drive transistor Q1. The combination of a capacitor C3 and the resistor R23 provide high frequency negative feedback to stabilize the U3C-Q1 feedback loop and to reduce electromagnetic interference. A resistor R1, coupled between the non-inverting input of the differential amplifier U3C and the electrochromic element 308, provides electrostatic discharge (ESD) protection for the differential amplifiers U3C and U3B.

If the DC glare signal EC_REQ exceeds the drive signal EC_DRIVE by more than approximately 25 mV, for example, the output of the differential amplifier U3B regulates the conductance of transistor Q6. The voltage at the output of the differential amplifier U3B stabilizes at the point required to cause the drive transistor Q6 to source just enough current to match the EC_DRIVE and EC_REQ+25 mV. The resistors R16 and R33 offset the voltage at the inverting input of the differential amplifier U3B by approximately 25 mV. Because the resistor R33 has a much higher resistance than the resistor R16, it behaves more like a current source than like a voltage divider. This causes the largest percentage error when the electrochromic element voltage EC_DRIVE is near 0 V. Because the electrochromic element is clear until its voltage reaches about 0.4 V, this error is negligible once the electrochromic element begins to darken. The current supplied by the resistor R33 flows through the resistor R16 and adds approximately 25 mV to the signal EC_DRIVE to produce the signal EC_REQ+25 mV. This offset insures that the drive transistors Q1 and Q6 will not turn on at the same time. A pair of capacitors C8 and C9 control the loop gain of the U3B-Q6 loop at high frequencies to ensure stability. The resistor R21 connected to the output of the differential amplifier U3B limits the base current to the transistor Q6 and, in conjunction with the capacitor C9, sets a high frequency pole. The combination of the resistor R16 and the capacitor C8 sets another high frequency pole. The resistor R16 also provides ESD protection to the differential amplifier U3B. A resistor R3 limits the collector current of the drive transistor Q6.

Capacitors C1, C10 and C11 provide a power supply bypass to ensure the stability of the differential amplifiers U1-U1C, and U3-U3C. A pair of capacitors C3 and C9, coupled to the drive transistors Q1 and Q6, provide EMI and ESD protection to the drive circuit 300. A resistor R3, disposed in series with the collector of the transistor Q6, reduces Q6's power dissipation.

Figure 4:
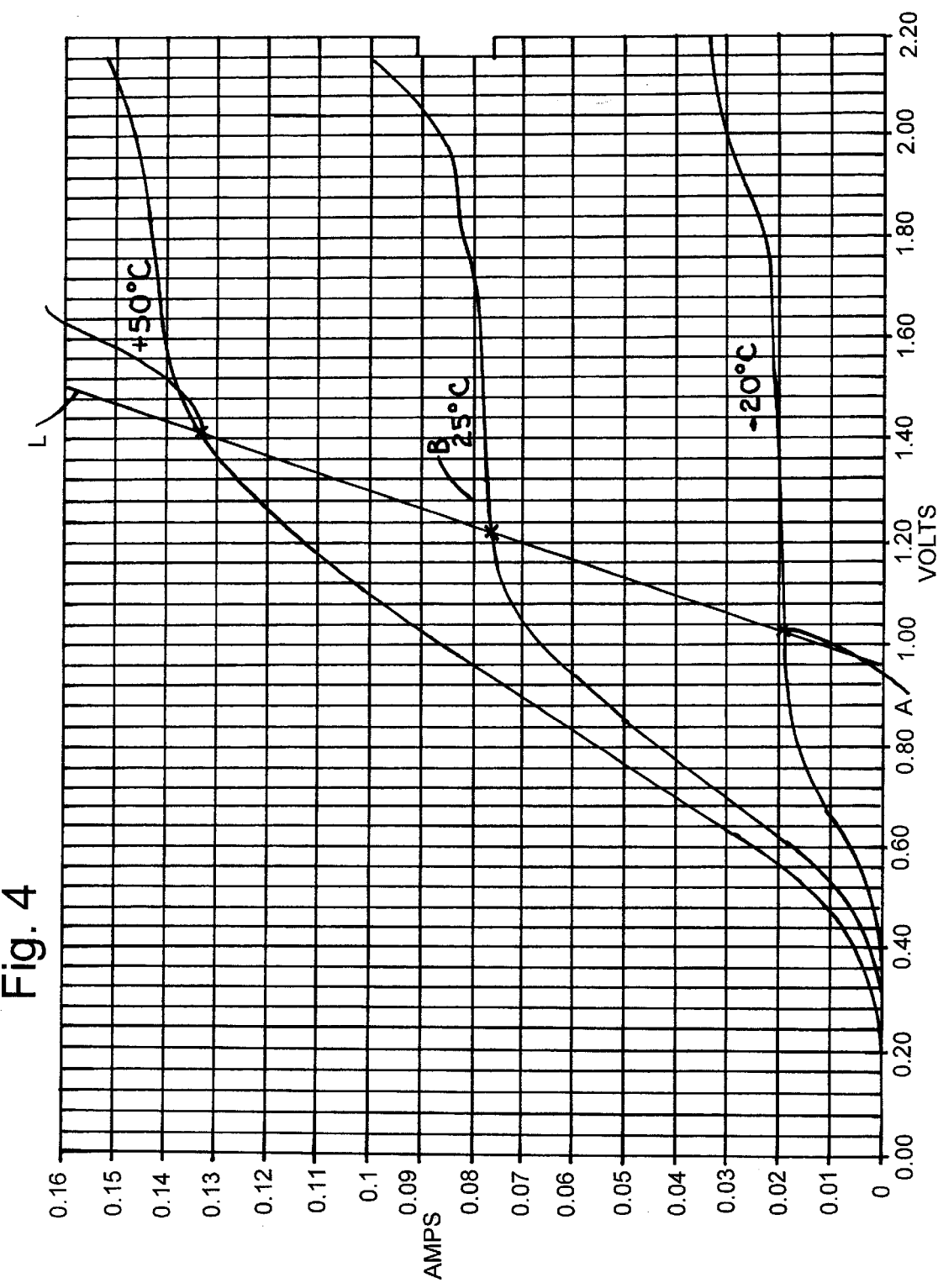
FIG. 4 is a graph illustrating a current-voltage (IV) relationship between current draw and voltage across an electrochromic element exhibited by an electrochromic element control arrangement at different operating temperatures according to an embodiment of the present invention.

It can be seen that to optimize the drive voltage applied across the electrochromic element 102 at a particular temperature according to the invention, the driver 104 preferably incorporates a feedback loop that provides a negative output resistance for which the output voltage increases with increasing current draw to the electrochromic element. FIG. 4 is a graph illustrating an example current-voltage (IV) relationship between current draw and voltage applied across the electrochromic element 102 of FIG. 1 at temperatures of 50° C., 25° C., and −20° C. The straight line L in FIG. 4 represents drive voltages as a function of current draw for a given circuit command level with a possible negative output resistance. The intersections A, B and C illustrate the drive voltages at −20° C., 25° C. and 50° C. respectively. The optimum value of negative resistance would produce intersection points A, B and C on FIG. 4 near the knees of the curves, where the current becomes substantially constant for further increases in applied voltage. Other considerations such as avoiding excessive voltage on the chemical layer during transitions from clear to opaque may force the use of a smaller magnitude value of negative resistance.

It is readily observed that the drive voltage increases with increasing temperature. Accordingly, at high temperatures, the drive voltage is high enough to cause the entire surface of the electrochromic element 102 of FIG. 1 to darken sufficiently quickly. At lower temperatures, the drive voltage is lower, slowing the degradation of the electrochromic chemical and increasing the lifetime of the electrochromic element 102. Further, power is conserved at temperatures at which the drive voltage need not be high.

It will be appreciated by those skilled in the art that the arrangement illustrated in FIG. 1 can be modified for other applications. According to an alternative embodiment, the light detectors 106 and 108 can be replaced by a single light detector for applications in which the electrochromic element 102 need not respond to changes in the amount of glare. For example, a single light detector can be used in conjunction with an electrochromic element 102 implemented is a window that lightens and darkens in response to ambient light conditions. It will also be appreciated that the desired negative output impedance characteristic can be achieved without the preferable direct current response circuits of FIGS. 2 and 3. For example, input relating to directly to temperature may be provided using a temperature sensor such as a thermistor.

The various embodiments described above are provided by way of illustration only and should not be construed to limit the invention. Those skilled in the art will readily recognize various modifications and changes that can be made to these embodiments without strictly following the example embodiments and applications illustrated and described herein, and without departing from the true spirit and scope of the present invention, which is set forth in the following claims.

What is claimed is:

1. A control arrangement for controlling an electrochromic element, the control arrangement comprising:
    a drive circuit, configured and arranged to selectively apply a drive voltage across the electrochromic element in response to at least one of a glare signal and an ambient light level, the drive circuit being characterized by a negative output resistance;
    a feedback arrangement, integral with the drive circuit and configured and arranged to vary the drive voltage as a function of current draw in the electrochromic element; and
    at least one light sensor arrangement, configured and arranged to detect the ambient light level and to provide an indication thereof to the drive circuit
    whereby the drive voltage will increase at higher element temperatures and decrease at lower element temperatures.

2. A control arrangement, according to claim 1, wherein the feedback arrangement is configured and arranged to detect the ambient temperature using at least one of a thermistor and a direct current response.

3. A control arrangement, according to claim 1, wherein the electrochromic element comprises at least one of a mirror and a window.

4. A control arrangement, according to claim 1, wherein the glare signal is one of a pulse width modulated signal and a digital signal.

5. A control arrangement, according to claim 4, wherein a reflectance level of the electrochromic element is varied as a function of a duty cycle of the pulse width modulated signal.

6. A control arrangement for controlling an electrochromic element, the control arrangement comprising:
    a drive circuit, configured and arranged to selectively apply a drive voltage across the electrochromic element in response to at least one of a glare signal and an ambient light level, the drive circuit being characterized by a negative output resistance;
    a feedback arrangement, integral with the drive circuit and arranged to increase the drive voltage across the electrochromic element in response to an increase in current draw by the electrochromic element and further arranged to decrease drive voltage across the electrochromic element in response to a decrease in current draw by the electrochromic element; and
    at least one light sensor arrangement, configured and arranged to detect the ambient light level and to provide an indication thereof to the drive circuit.

7. A control arrangement, according to claim 6, wherein the feedback arrangement comprises:
    a microcontroller having at least first and second outputs;
    a first transistor arrangement, coupled to the first output of the microcontroller and configured to enter a conducting mode in response to assertion of the first output;
    a second transistor arrangement, coupled to the first transistor arrangement and configured to reduce a base voltage of the first transistor arrangement in response to an output voltage at the electrochromic element exceeding the sum of an emitter voltage of the second transistor arrangement and the base voltage; and
    a third transistor arrangement, responsive to the first and second transistor arrangements and configured to control the output voltage at the electrochromic element.

8. A control arrangement, according to claim 7, further comprising a fourth transistor arrangement, configured and arranged to selectively short the electrochromic element.

9. A control arrangement for controlling an electrochromic element, the control arrangement comprising:
    a drive circuit, configured and arranged to selectively apply a drive voltage across the electrochromic element in response to at least one of a glare signal and an ambient light level, the drive circuit being characterized by a negative output resistance;
    a feedback arrangement, integral with the drive circuit and configured and arranged to vary the drive voltage as a function of current draw in the electrochromic element, the feedback arrangement comprising:
        a microcontroller having at least first and second outputs,
        a first transistor arrangement, coupled to the first output of the microcontroller and configured to enter a conducting mode in response to assertion of the first output,
        a second transistor arrangement, coupled to the first transistor arrangement and configured to reduce a base voltage of the first transistor arrangement in response to an output voltage at the electrochromic element exceeding the sum of an emitter voltage of the second transistor arrangement and the base voltage,
        a third transistor arrangement, responsive to the first and second transistor arrangements and configured to control the output voltage at the electrochromic element, and
        a fourth transistor arrangement, configured and arranged to selectively short the electrochromic element; and
    at least one light sensor arrangement, configured and arranged to detect the ambient light level and to provide an indication thereof to the drive circuit.

* * * * *